United States Patent [19]
Lodico et al.

[11] Patent Number: 6,004,237
[45] Date of Patent: Dec. 21, 1999

[54] SLIDE IDLER FOR A CHAIN DRIVE

[75] Inventors: James Irwin Lodico, Hampton; Jeremy Shane Ostrander, Geneseo; Chad Eric Plattner, Buda, all of Ill.

[73] Assignee: Deere & Company, Moline, Ill.

[21] Appl. No.: 09/135,227

[22] Filed: Aug. 17, 1998

[51] Int. Cl.[6] ..................................................... F16H 7/12
[52] U.S. Cl. ........................... 474/138; 474/135; 474/134; 474/207; 474/117
[58] Field of Search ...................... 474/84, 138, 133–135, 474/117, 86–89, 128–132, 207–209, 228, 229, 230, 232, 231; 411/361; 172/21, 350

[56] References Cited

U.S. PATENT DOCUMENTS

| | | | |
|---|---|---|---|
| 4,036,069 | 7/1977 | Clark | 474/135 |
| 4,271,663 | 6/1981 | Templin et al. | 474/207 X |
| 5,026,326 | 6/1991 | Pollich et al. | 474/134 |
| 5,461,852 | 10/1995 | Nagamatsu | 474/207 X |
| 5,525,114 | 6/1996 | Gehrke | 474/207 |

OTHER PUBLICATIONS

Kinze Advertising publication pp. 6–7.
Deere & Co. Parts Catalog 1700 Series Planting Units and Attachments (Jan. 22, 1997) pp. A9–A10.
Deere & Co. Parts Catalog 7200, 7300, 1760 and 1780 Maxemerge®2 Planting Units and Attachments (Jan. 22, 1997) pp. A21–A22.
Deere & Co. Internet Page Planting Units (1996).

*Primary Examiner*—Tamara L. Graysam
*Assistant Examiner*—Marcus Charles

[57] ABSTRACT

A slide idler for a chain drive wherein the idler is provided with easily replaceable and rotatable bushings. The slide idler comprises two elongated members, each elongated member is provided with two inwardly extending polygonal mounting assemblies. Two cylindrical bushings having polygonal apertures corresponding to the polygonal mounting assemblies are mounted to these mounting assemblies and are sandwiched between the elongated members. A split pin is used to hold the slide idler together.

15 Claims, 1 Drawing Sheet

SLIDE IDLER FOR A CHAIN DRIVE

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

1. Field of the Invention

The invention is directed to a slide idler for a chain drive having replaceable and positionable cylindrical bushings.

2. Description of the Prior Art

Idlers for chain drives are well known in the art. These idlers are usually spring biased to apply a tension to the chain so it does not become uncogged from the driven or driven sprockets. Some idlers are provided with freely rotatable sprockets for engaging the chain. Other idlers such as slide idlers are made of plastic material and are provided with cylindrical surfaces that slide along the chain.

One design of a slide idler, uses two elongated members having two cylindrical bushings sandwiched therebetween. The bushings are affixed to the elongated members. Cylindrical apertures pass through the elongated members and the bushings. The bushing is mounted on a spindle of a frame and a spring is positioned between the spindle and the idler to bias it into contact with the chain. The bushings of this idler cannot be replaced or rotated into different engagement positions.

SUMMARY OF THE INVENTION

The slide idler of the present invention is provided with two elongated members. Each elongated member is provided with a first inwardly extending polygonal mounting assembly and a second inwardly extending polygonal mounting assembly. Two replaceable cylindrical bushings having polygonal apertures are mounted to the mounting assemblies and are sandwiched between the elongated members. The mounting assemblies define cylindrical apertures passing through the idler. One of these cylindrical apertures would be mounted on a spindle that forms part of a frame. The other cylindrical apertures is provided with a spilt pin having resilient legs for holding the idler together. By pinching the legs of the pin the idler can be taken apart and the cylindrical bushings can be rotated or replaced as required.

In a chain drive having a drive sprocket a driven sprocket and an entraining chain, the chain passes between the cylindrical bushings. The idler is secured to a spindle of a frame and is biassed into engagement with the chain by a spring extending between the spindle and the idler.

DETAILED DESCRIPTION

Figure 1:
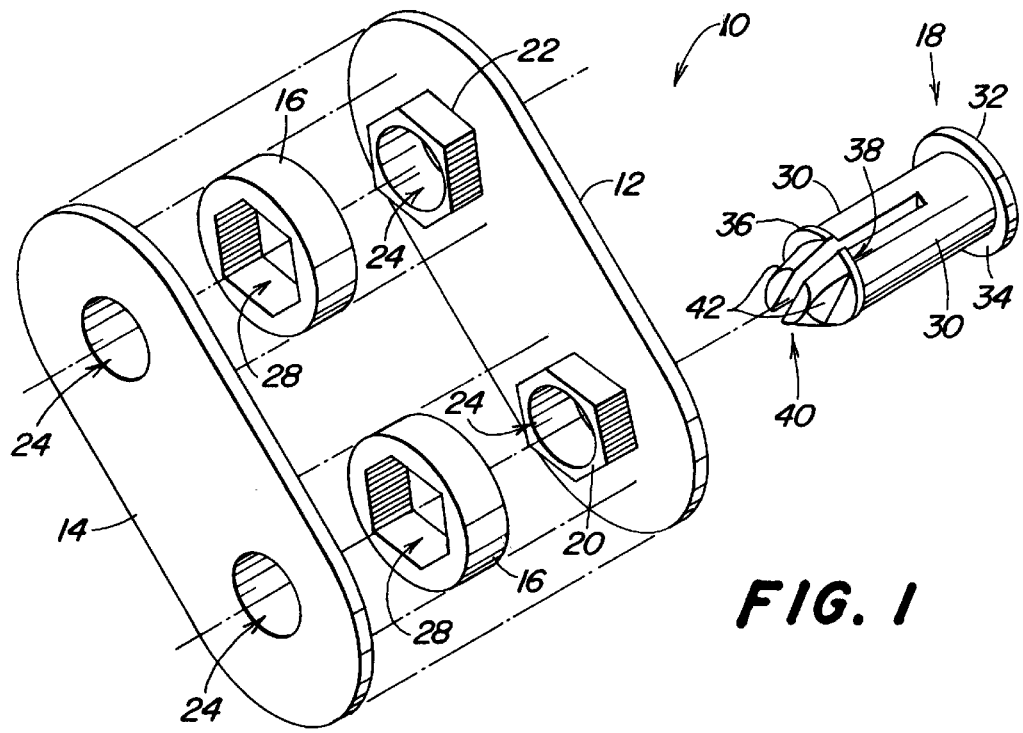
FIG. 1 is an exploded view of the slide idler of the present invention.

The slide idler 10 illustrated in FIG. 1 comprises a first elongated member 12, a second elongated member 14, two replaceable cylindrical bushings 16 and a split pin 18. Both elongated members are provided with a first inwardly extending polygonal mounting assembly 20 and a second polygonal mounting assembly 22. In the illustrated embodiment, the polygonal mounting assemblies are six sided but other configurations could also be used. A circular aperture 24 passes through the mounting assemblies. Two cylindrical bushings 16 are sandwiched between the elongated members 12 and 14. Both bushings are provided with polygonal apertures 28 into which are inserted the corresponding polygonal mounting assemblies and render the cylindrical bushings non-rotatable. The split pin 18 is provided with resilient legs 30 and is inserted into one of the circular apertures 24 for holding the slide idler 10 together. To hold the slide idler together the split pin is provided with a cap 32 having and underside 34 for abutting the exterior surface of the first elongated member 12. In addition both split pin legs 30 are provided with a boss 36 having an abutment surface 38 for abutting the second elongated member 14.

In assembling the slide idler 10, the two cylindrical bushings 16 are first mounted on the first and second mounting assemblies of the first elongated member 12. The second elongated 14 and its corresponding mounting assemblies are then pressed over the mounted bushings 16 securing the elongated members 12 and 14 together and sandwiching the bushings 16 therebetween. The conical portion 40 of the split pin 18 is inserted into one of the circular apertures 24 compressing the resilient legs 30. The split pin 18 is then pushed into the circular aperture 24 until the underside 34 of the cap 32 bears against the exterior surface of the first elongated member 12. The pin 18 is sized so that when the underside 34 engages the first elongated member, the boss 36 has passed through the second elongated member 14 and its of the abutment surface 38 has engaged the exterior surface of the second elongated member 14 as the legs 30 resiliently spring back apart.

To take the slide idler apart the process is reversed with the operator pinching the conical portion 40 compressing the split legs 30. The conical portion is provided with flat engagement surfaces 42 to facilitate this operation. The pin 18 is pushed through the circular aperture 24 and the elongated members 12 and 14 are pulled apart releasing the cylindrical bushings 16.

Figure 2:
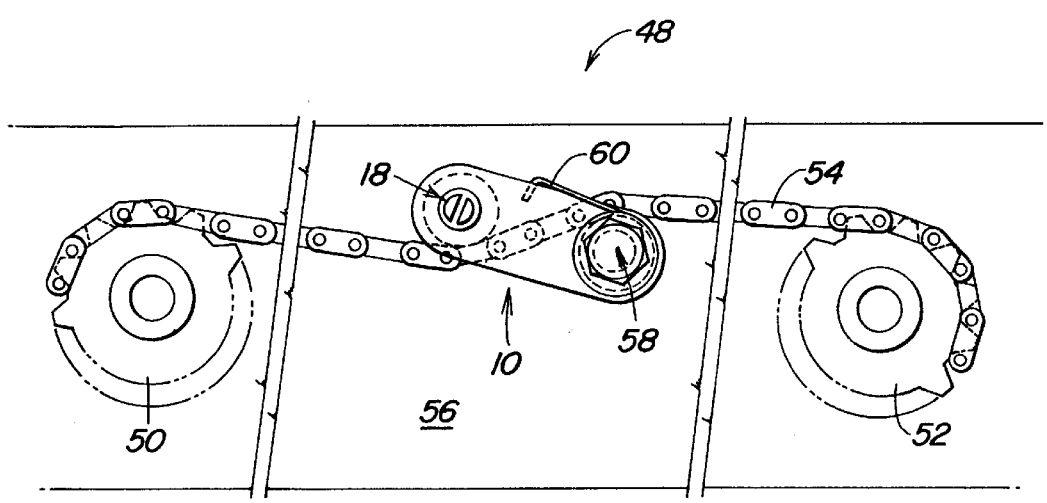
FIG. 2 is a chain drive in which the slide idler of the present invention is used.

FIG. 2 illustrates the mounting the slide idler 10 to a chain drive 48. The chain drive 48 is provided with a drive sprocket 50, a driven sprocket 52 and a chain 54 entrained about the sprockets 50 and 52. The slide idler 10 is pivotally mounted to a frame 56 on a spindle 58. The chain 54 extends between the circular bushings 16 contacting both bushings. The bushings 16 are biased against the chain 54 by a spring 60. The spring extends between the spindle 58 and the elongated members 12 and 14 biasing the slide idler 10 counterclockwise so that the circular bushings 16 engage the chain 54.

The interior surfaces of the elongated members form a guide mechanism for guiding the chain and limiting its transverse displacement thereby keeping it in better alignment.

The slide idler 10 can be taken apart on the chain without removing the chain. This enables the operator to replace the circular bushings 16 or rotate the bushings as needed.

The slide idler design of the present invention is a relatively simple design with only three different parts two identical elongated members, two identical cylindrical bushings and a split pin. The elongated members and the cylindrical bushings are made from a rigid wear resistant plastic, whereas the split pin is made from a resilient plastic.

The invention should not be limited to the above described embodiment, but should be limited solely to the claims that follow.

We claim:

1. A slide idler for a chain drive, the idler comprising:
   a first elongated member and a second elongated member, both elongated members having a first inwardly extending polygonal mounting assembly and a second inwardly extending polygonal mounting assembly, each of the mounting assemblies having an aperture extending therethrough;
   two replaceable cylindrical bushings each having a polygonal aperture for receiving the polygonal mounting assemblies of the elongated members, the cylindrical bushings are sandwiched between the elongated members with one of the cylindrical bushings, wherein both elongated members have first a first inwardly extending polygonal mounting assembly and a second inwardly extending polygonal mounting assembly and the replaceable cylindrical bushings are provided with polygonal apertures for receiving the polygonal mounting assemblies rendering the cylindrical bushing non-rotatable being mounted on the first inwardly extending mounting assemblies on both elongated members and the other cylindrical bushing being mounted on the second inwardly extending mounting assemblies of both elongated members rendering the cylindrical bushings non-rotatable.

2. A slide idler as defined by claim 1 further comprising a split pin which is inserted through apertures in the first inwardly extending mounting assemblies for securing both elongated members together about the cylindrical bushings.

3. A slide idler as defined by claim 2 wherein the split pin is provided with a cap having an underside for abutting the first elongated member.

4. A slide idler as defined by claim 3 wherein the split pin is provided with two resilient legs.

5. A slide idler as defined by claim 4 wherein each of the resilient legs are provided with a boss having an abutment surface for engaging the second elongated member.

6. A slide idler as defined by claim 5 wherein the apertures extending through the mounting assemblies are circular.

7. A chain drive, the chain drive comprising:
   a drive sprocket;
   a driven sprocket;
   a chain interconnecting the drive sprocket and the driven sprocket;
   a frame having a spindle;
   a slide idler is mounted to the spindle of the frame, the slide idler is provided with first and second elongated members and two replaceable cylindrical bushings, are sandwiched between the elongated members, the chain passes between the two cylindrical bushings and contacts both cylindrical bushings.

8. A chain drive as defined by claim 7 wherein each of the polygonal mounting assemblies have an aperture extending therethrough, one of the apertures is mounted over the spindle of the frame.

9. A chain drive as defined by claim 8 further comprising a spring extending between the frame and the slide idler for biassing the cylindrical bushings of the idler into contact with the chain.

10. A chain drive as defined by claim 9 wherein the spring extends between the spindle of the frame and one of the elongated members.

11. A chain drive as defined by claim 9 comprising a split pin which is inserted through apertures in the aperture opposite from where the spindle is inserted for securing both elongated members together about the cylindrical bushings.

12. A chain drive as defined by claim 11 wherein the split pin is provided with a cap having an underside for abutting the first elongated member.

13. A chain drive as defined by claim 12 wherein the split pin is provided with two resilient legs.

14. A chain drive as defined by claim 13 wherein each of the resilient legs are provided with a boss having an abutment surface for engaging the second elongated member.

15. A slide idler for a chain drive, the idler comprising:
    a first elongated member and a second elongated member, both elongated members having a first inwardly extending polygonal mounting assembly and a second inwardly extending polygonal mounting assembly, the polygonal mounting assemblies define a series of mounting locations;
    two replaceable cylindrical bushings each having a polygonal aperture for receiving the polygonal mounting assemblies of the elongated members, the cylindrical bushings are sandwiched between the elongated members with one of the cylindrical bushings being mounted on the first inwardly extending mounting assemblies on both elongated members and the other cylindrical bushing being mounted on the second inwardly extending mounting assemblies of both elongated members rendering the cylindrical bushings non-rotatable, the cylindrical bushings can be placed in different mounting locations as defined by the polygonal mounting assemblies.

\* \* \* \* \*